(12) United States Patent
Azegami et al.

(10) Patent No.: US 10,124,422 B2
(45) Date of Patent: Nov. 13, 2018

(54) HOLDER FOR HEAD REPLACEMENT-TYPE CUTTING TOOL AND HEAD REPLACEMENT-TYPE CUTTING TOOL

(75) Inventors: Takayuki Azegami, Akashi (JP); Yoshihiko Kimura, Akashi (JP); Taro Abe, Akashi (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 316 days.

(21) Appl. No.: 14/351,885

(22) PCT Filed: Oct. 17, 2011

(86) PCT No.: PCT/JP2011/073823
§ 371 (c)(1),
(2), (4) Date: Apr. 15, 2014

(87) PCT Pub. No.: WO2013/057778
PCT Pub. Date: Apr. 25, 2013

(65) Prior Publication Data
US 2014/0234035 A1    Aug. 21, 2014

(51) Int. Cl.
*B23C 5/10* (2006.01)
*B23B 31/00* (2006.01)
(Continued)

(52) U.S. Cl.
CPC ............ *B23C 5/109* (2013.01); *B23B 31/005* (2013.01); *B23B 31/008* (2013.01);
(Continued)

(58) Field of Classification Search
CPC ......... Y10T 409/30952; B23B 31/1122; B23B 31/1107; B23B 31/11; B23B 31/1115;
(Continued)

(56) References Cited

U.S. PATENT DOCUMENTS 4,051,905 A * 10/1977 Kleine .................. B23B 31/005
173/104
7,101,127 B2 * 9/2006 Kimura .................. B23B 31/06
408/239 A
(Continued)

FOREIGN PATENT DOCUMENTS

CN    1442261 A    9/2003
CN    101844236 A  9/2010
(Continued)

OTHER PUBLICATIONS

International Search Report dated Nov. 8, 2011, issued for PCT/JP2011/073823 and English translation thereof.
(Continued)

*Primary Examiner* — Alan Snyder
(74) *Attorney, Agent, or Firm* — Locke Lord LLP

(57) ABSTRACT

The holder for a head replacement-type cutting tool is provided with a holder main body and a tubular coupling member 3 which is housed in an attachment hole formed on the holder main body and made of a metal material lower in hardness than the holder main body. A recessed part is formed on an inner circumferential face of the attachment hole, the coupling member is engaged with the recessed part by firmly attaching the outer circumferential face thereof on the inner circumferential face of the attachment hole, and the coupling member is provided with an attachment screw part which is screwed into a head-side screw part formed at the replacement-type cutting head.

12 Claims, 7 Drawing Sheets

(51) Int. Cl.
*B23B 31/11* (2006.01)
*B23P 11/00* (2006.01)

(52) U.S. Cl.
CPC ............ *B23B 31/1122* (2013.01); *B23C 5/10* (2013.01); *B23C 2210/02* (2013.01); *B23C 2210/03* (2013.01); *B23C 2240/32* (2013.01); *B23C 2265/08* (2013.01); *B23C 2265/32* (2013.01); *B23P 11/00* (2013.01); *Y10T 407/1908* (2015.01)

(58) Field of Classification Search
CPC . B23C 5/109; B23C 2210/02; B23C 2240/32; B23C 2270/06
See application file for complete search history.

(56) References Cited

U.S. PATENT DOCUMENTS

| | | | |
|---|---|---|---|
| 7,713,004 | B2 | 5/2010 | Lehto et al. |
| 7,753,628 | B2 * | 7/2010 | Hecht ..................... B23B 31/11 279/8 |
| 8,714,893 | B2 * | 5/2014 | Taguchi ................ B23B 31/201 408/143 |
| 8,864,425 | B2 * | 10/2014 | Osawa .................... B23B 51/02 408/144 |
| 8,956,091 | B2 * | 2/2015 | Nonaka .................. B23B 31/11 408/233 |
| 2007/0104549 | A1 * | 5/2007 | Hecht .................. B23D 77/006 408/233 |
| 2007/0196188 | A1 | 8/2007 | Hecht et al. |
| 2010/0247263 | A1 * | 9/2010 | Azegami ............. B23B 31/1107 409/234 |
| 2015/0151365 | A1 * | 6/2015 | Haimer ............... B23B 31/1107 279/99 |

FOREIGN PATENT DOCUMENTS

| | | | | |
|---|---|---|---|---|
| DE | 102009034202 | * | 9/2010 | ......... B23B 31/1107 |
| FR | 1019411 A | * | 1/1953 | ....... B32B 29/03432 |
| FR | 2602162 A1 | * | 2/1988 | ........ B23B 31/1107 |
| GB | 555279 A | * | 8/1943 | ........ B23B 31/1107 |
| JP | 04-336907 A | | 11/1992 | |
| JP | 05-050305 A | | 3/1993 | |
| JP | 2001-500801 A | | 1/2001 | |
| JP | 2001-219320 A | | 8/2001 | |
| JP | 2003-251540 A | | 9/2003 | |
| JP | 2003-291044 A | | 10/2003 | |
| JP | 2004-504162 A | | 2/2004 | |
| JP | 2004-098272 A | | 4/2004 | |
| JP | 2004-130412 A | | 4/2004 | |
| JP | 2007-216378 A | | 8/2007 | |
| JP | 2007-290120 A | | 11/2007 | |
| JP | 2009-527368 A | | 7/2009 | |
| JP | WO 2010035475 A1 | * | 4/2010 | ............. B23B 27/12 |
| JP | 2011-062787 A | | 3/2011 | |
| JP | 2011062787 A | * | 3/2011 | ............... B23C 5/22 |
| JP | 2011-143532 A | | 7/2011 | |
| WO | WO-98/13161 A1 | | 4/1998 | |
| WO | WO-02/05996 A1 | | 1/2002 | |
| WO | WO 0214005 A1 | * | 2/2002 | ............. B23B 31/11 |
| WO | WO-2007/096861 A1 | | 8/2007 | |

OTHER PUBLICATIONS

Office Action dated Jan. 28, 2014, issued for the Japanese patent application No. 2010-218643 and English translation thereof.
Office Action dated Jun. 3, 2015, issued for the Chinese patent application No. 201180073691.2 and English translation thereof.

* cited by examiner (a)

(c)  (b)

HOLDER FOR HEAD REPLACEMENT-TYPE CUTTING TOOL AND HEAD REPLACEMENT-TYPE CUTTING TOOL

TECHNICAL FIELD

The present invention relates to a holder for a head replacement-type cutting tool in which a replacement-type cutting head having a cutting part is attached in a detachable manner to constitute a head replacement-type cutting tool and also to a head replacement-type cutting tool, with the cutting head attached to the holder.

DESCRIPTION OF THE RELATED ART

As the above-described holder for a head replacement-type cutting tool, Patent Document 1 discloses a holder in which a steel part is firmly bonded by soldering to a shank part made of a cemented carbide, a convex/concave mating part is formed on an end face of the steel part which a cutting edge member (cutting head) is attached in a detachable manner, and a female thread part used to axially fix the cutting edge member is formed behind the convex/concave mating part. Further, Patent Documents 2 and 3 have disclosed that when a cutting head made of the cemented carbide is screwed and attached to a leading end part of a steel-made holder, in order to prevent the cemented carbide-made screw thread from being broken due to concentration of stress, the screw thread is formed in a special non-symmetrical shape.

PRIOR ART DOCUMENTS

Patent Documents

Patent Document 1: Japanese Unexamined Patent Application, First Publication No. 2003-251540
Patent Document 2: Japanese Unexamined Patent Application, First Publication No. 2007-290120
Patent Document 3: U.S. Pat. No. 7,713,004

SUMMARY OF THE INVENTION

Problems to be Solved by the Invention

However, as described in Patent Document 1, where the cutting head is attached by soldering the steel part to the leading end of the shank part made of the cemented carbide, it is difficult to retain the strength of a bonded part between the shank part and the steel part, and the bonded part may be broken due to a cutting resistance.

Further, the steel part is provided between the cutting head and the shank part, and the tool in its entirety may be decreased in rigidity to cause chattering vibration or a reduction in machining accuracy. Still further, it is not easy to collect separately the cemented carbide and steel bonded by soldering after use. On the other hand, as described in Patent Documents 2 and 3, it is difficult to form a screw thread directly on the cemented carbide. In particular, an attempt to form a special-shape screw thread which is described in Patent Documents 2 and 3 will inevitably result in a great increase in cost.

The present invention has been made under the above-described circumstances, an object of which is to provide a holder for a head replacement-type cutting tool which allows for separate collection, is low in cost, high in strength and rigidity, free from breakage and chattering vibration, and made of hard materials such as the cemented carbide which can realize highly accurate machining and also provide a head replacement-type cutting tool, with the cutting head attached to the holder.

Means for Solving the Problems

A holder for a head replacement-type cutting tool of the present invention is a holder for a head replacement-type cutting tool in which a replacement-type cutting head having a cutting part is to be attached to an attachment hole of the holder in a detachable manner to constitute a head replacement-type cutting tool. The holder is provided with a holder main body and a tubular coupling member which is housed in the attachment hole formed on the holder main body and which is made of a metal material with a lower hardness than the holder main body, in which a recessed part is formed on an inner circumferential face of the attachment hole, the coupling member is engaged with the recessed part so that an outer circumferential face thereof is firmly attached to the inner circumferential face of the attachment hole, and the coupling member is provided with an attachment screw part which is screwed into a head-side screw part formed on the replacement-type cutting head.

It is also acceptable that the head replacement-type cutting tool of the present invention is such that the replacement-type cutting head is attached into the attachment hole on the thus constituted holder for a head replacement-type cutting tool by screwing the head-side screw part into the attachment screw part.

In the above-constituted holder for a head replacement-type cutting tool and the head replacement-type cutting tool, the coupling member housed into the attachment hole formed on the holder main body is engaged with the recessed part of the inner circumferential face of the attachment hole and thereby integrated with the holder main body. Moreover, on the coupling member, there is formed an attachment screw part which is screwed into the head-side screw part of the replacement-type cutting head. Therefore, even where the holder main body is formed with a hard material such as the cemented carbide, cermet or ceramic, the coupling member is formed with a steel material such as stainless steel or dies steel lower in hardness but higher in ductility than the hard material. Thereby, it is possible to prevent breakage of a screw thread. Also eliminated is the necessity for giving a special shape to the screw thread of the attachment screw part, thus making it possible to prevent an increase in cost.

Further, since the tubular coupling member is made lower in hardness than the holder main body, the coupling member is able to easily undergo plastic deformation. Therefore, for example, a press-fit member having an outer diameter larger than an inner diameter of the coupling member is press-fitted into an inner circumferential part of a blank of the coupling member disposed at a part where a recessed part of the attachment hole is formed and allowed to undergo plastic deformation so as to increase the diameter of the coupling member as a whole. Thereby, an outer circumferential part of the coupling member is fitted into the recessed part, an outer circumferential face thereof is then firmly attached on the inner circumferential face of the attachment hole, by which the coupling member is reliably engaged with the recessed part and can be firmly integrated with the holder main body. It is acceptable that the coupling member is provided with a through hole which penetrates through the inner circumferential part. Further, even where a press-fit member is press-fitted and if a side into which the press-fit member is press-fitted is opened, it is also acceptable that the coupling member is a closed-end tube in which the inner circumferential part thereof is in a closed-hole state.

On the other hand, the coupling member which is engaged by plastic deformation, is integrated with the holder simply by mechanical connection unlike soldering. Thus, the coupling member can be pulled out from the holder main body by applying an excessive tensile force thereto with the use of a jig. For example, a holder which is not usable due to breakage, can be collected by separating a holder main body from a coupling member, each of which is made with a different material.

Next, the replacement-type cutting head itself is attached into the attachment hole formed on the holder main body higher in hardness than the coupling member, while a head-side screw part thereof is screwed into the attachment screw part of the coupling member which has been thus engaged with the recessed part. Therefore, the head replacement-type cutting tool is able to secure high rigidity and high strength as a whole. It is, thus, possible to prevent the occurrence of breakage or chattering vibration and also to provide a highly accurate cutting.

The recessed part which is formed on an inner circumferential face of the attachment hole includes, for example, an annular groove formed on the inner circumferential face, a straight line groove running along a direction of a central axis of the attachment hole, a spiral groove and a studded dent. The recessed part is provided with at least one of a wall part which faces a hole bottom side of the attachment hole and a wall part which faces in a circumferential direction around the central axis, and it is acceptable that the outer circumferential face of the coupling member is brought into contact with the wall part and firmly attached, by which the coupling member is engaged with the recessed part and integrated with the holder main body. In particular, where the holder main body is formed with the above-described hard sintered material, it is acceptable that the roughness of the inner circumferential face of the attachment hole on the blank before sintering, sintering conditions and the like, are adjusted, by which the inner circumferential face after sintering is as an irregular surface with a maximum height roughness Rz from 5 μm or more to 200 μm or less, a recess itself of the irregular surface is as the recessed part, and the outer circumferential part of the coupling member is at least partially allowed to undergo plastic deformation so as to run along the irregular surface, the outer circumferential face of the coupling member is firmly attached on the inner circumferential face of the attachment hole to make an engagement therewith. As a matter of course, it is acceptable that the recessed part is provided with both the above-described irregular surface and the wall part.

Here, where the maximum height roughness Rz of the inner circumferential face of the attachment hole is less than 5 μm, the inner circumferential face becomes excessively smooth and may result in a failure in firmly integrating the coupling member with the holder main body.

On the other hand, where the maximum height roughness Rz is in excess of 200 μm, as described above, when the press-fit member is press-fitted into the inner circumferential part of the coupling member to cause plastic deformation and such an attempt is made that the outer circumferential part thereof is fitted into the recessed part and the outer circumferential face is firmly attached on the inner circumferential face of the attachment hole, in order that the coupling member is allowed to undergo plastic deformation without breakage and the outer circumferential part is reliably fitted into the irregular surface which is the recessed part, it is necessary to decrease a difference between an outer diameter of the outer circumferential part of the blank of the coupling member to be fitted into and an inner diameter of the inner circumferential face of the attachment hole. Thus, it is difficult to insert the blank of the coupling member into the attachment hole before plastic deformation.

It is also acceptable that the attachment screw part is a male thread part and the head-side screw part of the replacement-type cutting head is a female thread part. However, where the attachment screw part is the female thread part, in the coupling member, a range at which the female thread part is formed is allowed to overlap on a range at which the outer circumferential face is firmly attached on the inner circumferential face of the attachment hole in a direction of the central axis of the attachment hole. Moreover, it is possible to receive a cutting force acting on the head-side screw part from the replacement-type cutting head immediately on the inner circumference side of the coupling member where the outer circumferential face is engaged with the recessed part of the inner circumferential face of the attachment hole.

Further, the opening part side of the attachment hole is as a fitting part whose cross section orthogonal to the central axis of the attachment hole is formed in a circular shape at the center of the central axis and which is fitted into an attachment part formed at the replacement-type cutting head. Thereby, it is possible to receive the cutting force acting on the replacement-type cutting head at the fitting part as well and to reliably impart higher rigidity and strength to the head replacement-type cutting tool. That is in particular effective in a case where as described above, the attachment screw part is as a female thread part, and in the coupling member, a range in which the female thread part is formed is allowed to overlap on a range in which the outer circumferential face is firmly attached on the inner circumferential face of the attachment hole in the direction of the central axis of the attachment hole.

In particular, where the fitting part is formed in a tapered shape which gradually increases in inner diameter moving toward the opening part of the attachment hole, the attachment part of the replacement-type cutting head is also formed in a tapered shape equal in inclination angle which gradually increases in outer diameter moving toward a base end of the attachment part. The tapered face formed by the outer circumferential face of the attachment part is pressed evenly and uniformly to the tapered face formed by the inner circumferential face of the fitting part and fitted in a tapering manner. At the same time, a great friction resistance is allowed to take place between the tapered faces by wedge effects, thus making it possible to realize higher tool rigidity and tool strength.

On the other hand, it is possible to reduce a cutting force acting on the attachment screw part of the coupling member and a fastening torque of a screw. Thus, such a situation that the coupling member is pulled out can be prevented without giving an unnecessarily great engagement force of the coupling member with the attachment hole. As described above, where the holder main body and the coupling member are recovered separately, it is possible to remove the coupling member from the holder main body relatively easily. Further, each of the fitting part and the attachment part is formed in a tapered shape, by which the central axis of the attachment hole on the holder main body allows for alignment with the central axis of the attachment part of the replacement-type cutting head at high accuracy. Moreover, based on the central axis of the attachment part, the cutting part of the replacement-type cutting head is formed, thus making it possible to perform more accurate cutting.

It is noted that where an inclination angle of the fitting part formed in a tapered shape with respect to the central axis is excessively large, it is impossible to sufficiently realize high rigidity and high strength which would be obtained when the fitting part is fitted in a tapering manner. On the other hand, where the inclination angle is excessively small, a friction resistance which takes place between the tapered faces by wedge effects will become excessively large, thereby requiring a great force when the replacement-type cutting head is removed. Thus, it is preferable that the inclination angle is in a range of 1° to 20°. It is more preferable that the angle is in a range of 1° to 5°. It is still more preferable that the angle is in a range of 1° to 3°.

Still further, at the deepest part of the attachment hole, there is formed a recessed site having a wall face whose cross section orthogonal to the central axis of the attachment hole is formed in the shape of a straight line. Moreover, at the coupling member, there is formed a detent part which has a side face capable of being in contact with the above-described wall face so as to be opposed thereto and which is housed at the recessed site. Thereby, even where an unexpectedly great cutting force is applied from the replacement-type cutting head to the coupling member, the side face of the detent part is brought into contact with the wall face of the recessed site to restrain rotation of the coupling member. As a result, it is possible to prevent such a situation that the coupling member rotates loosely inside the attachment hole to be disengaged from the recessed part, thereby dropping off together with the cutting head. It is acceptable that the side face is in contact with the wall face from the start so as to be opposed thereto, thereby restraining rotation of the coupling member. It is also acceptable that the side face is opposed to the wall face, with an interval kept, and in contact with the wall face restrain rotation of the coupling member where the coupling member rotate with respect to the wall face.

Effects of the Invention

As described so far, according to the present invention, the coupling member on which the attachment screw part is formed is made of a material lower in hardness but higher in ductility than the holder main body. It is, thereby, possible to form a screw thread easily and at lower cost without any breakage. On the other hand, the holder main body is formed with a hard material which is high in rigidity and strength. Thus, the holder main body can be recovered separately from the coupling member and also firmly integrated. The replacement-type cutting head is attached into the attachment hole of the holder main body, thereby preventing occurrences of breakage or chattering vibration to perform highly accurate cutting.

MODE FOR CARRYING OUT THE INVENTION

Figure 1:
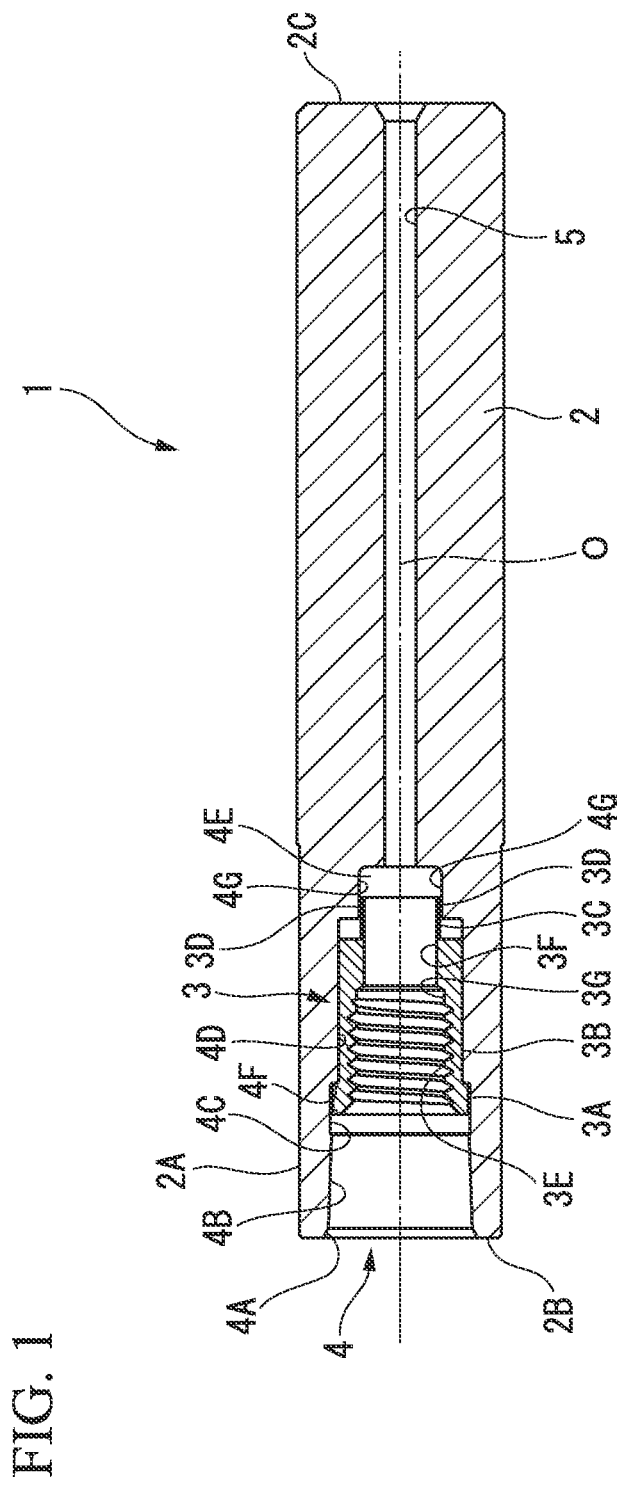
FIG. 1 is a side sectional view which shows one embodiment of a holder for a head replacement-type cutting tool of the present invention.
Figure 2:
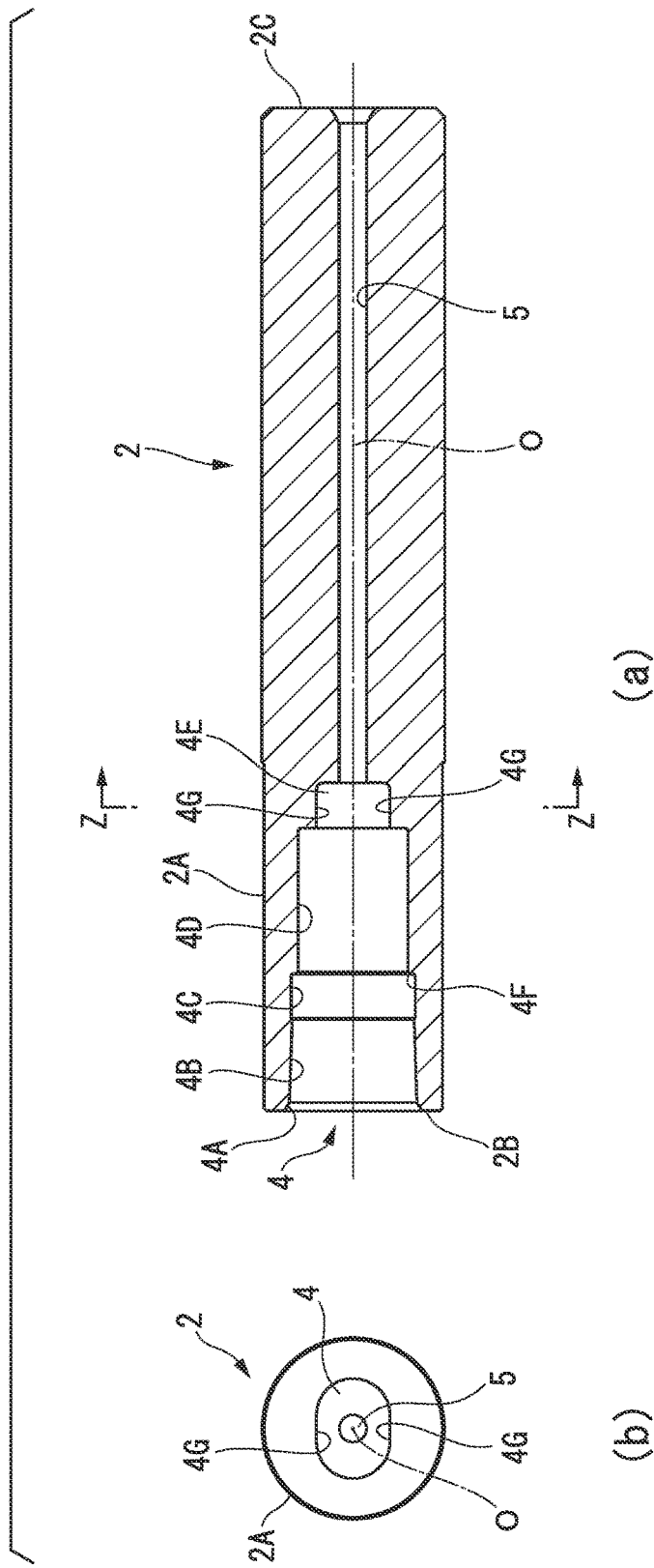
FIG. 2(a) is a side sectional view which shows a holder main body of the embodiment shown in FIG. 1, and (b) is a sectional view taken along the line of Z to Z in FIG. 2(a).

FIG. 1 to FIG. 4 shows one embodiment of the holder for a head replacement-type cutting tool of the present invention. FIG. 5 shows one embodiment of the head replacement-type cutting tool of the present invention in which the replacement-type cutting head is attached to the embodiment. The head replacement-type cutting tool is such that the present invention is applied to a head replacement-type end mill.

A holder for a head replacement-type cutting tool 1 of the present embodiment is constituted with a holder main body 2 and a coupling member 3. The holder main body 2 is made of a hard material such as a cemented carbide, cermet or ceramic. In particular, in the present embodiment, the holder main body 2 is formed with a sintered material which is obtained by molding a raw-material powder by powder compacting, heating and sintering the powder. On the other hand, the coupling member 3 is formed of a steel material such as stainless steel or dies steel which is lower in hardness but higher in ductility than the holder main body 2.

The holder main body 2 has an appearance which is formed substantially in a cylindrical shape at the center of a central axis O. However, a part of the leading end side of the holder main body (on the left side in FIG. 1, FIG. 2, FIG. 3(a) and FIG. 5) is as a neck part 2A formed in the shape of a cylindrical face which is even slightly smaller in outer diameter than a shank part at the rear end side thereof (on the right side in FIG. 1, FIG. 2, FIG. 3(a) and FIG. 5). Further, on a leading end face 2B of the holder main body 2, an attachment hole 4 is formed at the center of the central axis O so as to be recessed to the rear end side. Moreover, from a rear end face 2C of the holder main body 2, a through hole 5 smaller in diameter than the attachment hole 4 is formed along the central axis O so as to communicatively connect to a hole bottom of the attachment hole 4.

A chamfered part 4A, a fitting part 4B, a flank part 4C, an engaging part 4D and a recessed site 4E are formed in the attachment hole 4 sequentially from the leading end to the rear end. The chamfered part 4A is formed at a ridge line part intersecting with the leading end face 2B, and the fitting part 4B extends from the chamfered part 4A to the rear end side. The flank part 4C is made only slightly larger in inner diameter than the fitting part 4B at the rear end, and the engaging part 4D is made even smaller in inner diameter than the flank part 4C and the fitting part 4B at the rear end side. The recessed site 4E has a cross section orthogonal to the central axis O and the cross section is made smaller than the engaging part 4D. The through hole 5 is opened on a bottom which faces the leading end of the recessed site 4E.

Here, the chamfered part 4A, the fitting part 4B, the flank part 4C, the engaging part 4D and the through hole 5 excluding the recessed site 4E in the attachment hole 4 are such that each of the cross sections orthogonal to the central axis O is formed in a circular shape at the center of the central axis O. Of these parts, each of the flank part 4C, the engaging part 4D and the through hole 5 is provided with an inner circumferential face formed in the shape of a cylindrical face which is constant in inner diameter along a direction of the central axis O. Therefore, between the flank part 4C and the engaging part 4D, there is formed an annular wall part 4F which faces the leading end around an opening part of the engaging part 4D.

On the other hand, in the present embodiment, in addition to the above-described chamfered part 4A, even the fitting part 4B is formed in a tapered shape in which the inner circumferential face thereof is as a recessed circular cone face, the inner diameter of which gradually increases moving to the opening part of the attachment hole 4 at the center of the central axis O. Here, an inclination angle of the inner circumferential face of the taper-shaped fitting part 4B on a cross section along the central axis O with respect to the central axis O is smaller than an inclination angle of the chamfered part 4A. In the present embodiment, the angle is to be a certain angle in a range of 1° to 20°. It is noted that the opening part of the flank part 4C which is at the rear end side of the fitting part 4B is made slightly larger in inner diameter than the fitting part 4B.

Next, a recessed part is formed on the inner circumferential face of the engaging part 4D in the attachment hole 4. It is acceptable that the recessed part is such that after the holder main body 2 made of the above-described sintered material has been sintered and formed, an annular groove around the central axis O, a straight line groove along the direction of the central axis O, a spiral groove, a studded dent or the like, are formed by machining and others, thereby forming at least one of a wall part which faces the hole bottom side of the attachment hole 4 and a wall part which faces in a circumferential direction around the central axis O. In the present embodiment, as described above, conditions for powder-compacting and sintering the holder main body 2 and others are adjusted, by which the surface roughness of the inner circumferential face of the engaging part 4D is as an irregular surface which is stipulated by JIS B 0601: 2001 (ISO 42887: 1997) so that a maximum height roughness Rz is from 5 μm or more to 200 μm or less, and the irregular surface is as the above-described recessed part.

In other words, the holder main body 2 made of the sintered material is manufactured by procedures in which a raw-material powder is compacted by using a pressing mold to form a compressed powder body and the compressed powder body is heated, sintered and subjected to finishing work such as polishing, whenever necessary. Moreover, on molding the compressed powder body, the inner circumferential face of the engaging part 4D is processed so as to obtain the above-described surface roughness after sintering, the heating temperature and time of sintering are adjusted, and polishing is performed after sintering to adjust the surface roughness. Alternatively, the inner circumferential face of the engaging part 4D is not polished but kept in a sintered state as is. Thereby, it is possible to give the above-described surface roughness to the inner circumferential face of the engaging part 4D.

As a matter of course, it is acceptable that one of the above-described means is used to adjust the surface roughness of the inner circumferential face of the engaging part 4D or two or more means are combined appropriately to adjust the surface roughness. It is also acceptable that the inner circumferential face of the engaging part 4D is adjusted for its surface roughness to form the irregular surface, and a groove and a recess are also formed as described above, thereby forming at least one of the wall parts which faces the hole bottom side of the attachment hole 4 and the wall part which faces in a circumferential direction around the central axis O, which are combined to give a recessed part. In particular, for example, where a straight line groove is formed along the direction of the central axis O, a groove may be formed by using a pressing mold on molding a compressed powder body.

On the other hand, the recessed site 4E which is positioned at the deepest part of the attachment hole 4 has a cross section orthogonal to the central axis O and, in the present embodiment, as shown in FIG. 2(b), the cross section is formed in an ellipse shape having a long axis in a diametric direction with respect to the central axis O. Moreover, the recessed site 4E is formed so as to extend in the direction of the central axis O, with the ellipse shaped-cross section being kept constant. Therefore, on both sides behind the long axis, a pair of wall faces 4G, each of which is formed in the shape of a straight line on the cross section orthogonal to the central axis O, are formed so as to extend parallel with the central axis O and also parallel with each other.

As to the length of each part of the attachment hole 4 in the direction of the central axis O, in the present embodiment, the engaging part 4D is the longest, followed by the fitting part 4B. After that, the recessed site 4E is longer and followed by the flank part 4C, and the chamfered part 4A is the shortest. However, it is acceptable that no chamfered part 4A is formed. Further, the leading end face 2B of the holder main body 2 remaining at the periphery of the opening part of the attachment hole 4 is formed in the shape of a flat face which is perpendicular to the central axis O.

Figure 3:
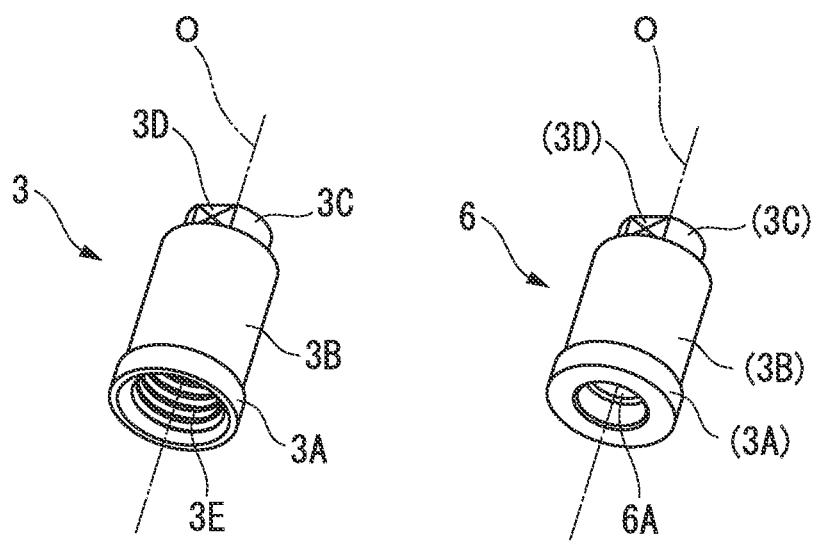
FIG. 3(a) is a drawing which shows a coupling member of the embodiment shown in FIG. 1, that is, a perspective view of a blank before plastic deformation.
FIG. 3(b) is a perspective view which shows the coupling member after the blank of FIG. 3(a) is allowed to undergo plastic deformation to form an attachment screw part (that is, a drawing which shows the coupling member itself which is integrated by being housed into an attachment hole of the holder).

The coupling member 3 is housed into the thus constituted attachment hole 4 of the holder main body 2. As shown in FIG. 3(b), the coupling member 3 is provided with an appearance which is formed substantially in a cylindrical shape with a plurality of steps at the center of the central axis O. Moreover, sequentially from the leading end (on the lower side in FIG. 3) to the rear end (on the upper side in FIG. 3), a collar part 3A which is housed at the flank part 4C of the attachment hole 4, an engaged part 3B which is housed at the engaging part 4D and a detent part 3C which is housed at the recessed site 4E are integrated so as to decrease in outer diameter in a stepwise manner.

Of these parts, the collar part 3A has an outer diameter which is larger than an inner diameter of the engaging part 4D of the attachment hole 4 and slightly smaller than an inner diameter of the fitting part 4B at the rear end side. The collar part 3A is made slightly shorter in length than the flank part 4C in the direction of the central axis O and allowed to be in contact with the wall part 4F of the attachment hole 4 from the leading end in a state that the coupling member 3 is attached to the holder main body 2. Further, the detent part 3C has a cross section orthogonal to the central axis O, and the cross section is formed in an ellipse in such a shape and a dimension that allow engagement with the recessed site 4E of the attachment hole 4. Therefore, on both sides behind the long axis of the ellipse, a pair of side faces 3D, each of which is formed in the shape of a straight line on a cross section orthogonal to the central axis O, are formed so as to extend parallel with the central axis O and also parallel with each other. In the above-described attachment state, they are opposed to the wall faces 4G of the recessed site 4E, with an interval kept.

Further, the inner circumferential part of the coupling member 3 is allowed to penetrate through along the central axis O. Moreover, a female thread part 3E is formed at the leading end thereof and is as an attachment screw part in the present embodiment. The female thread part 3E has an inner diameter which is larger than a through hole part 3F penetrating through the detent part 3C at the rear end of the inner circumferential part of the coupling member 3. In the above-described attachment state, the female thread part 3E extends from the leading end side of the coupling member 3 to the leading end further than the rear end of the engaged part 3B, for example, to a part exceeding ½ of the length of the engaging part 4D in the direction of the central axis O. It is noted that the length of the engaged part 3B in the direction of the central axis O is made slightly shorter than the length of the engaging part 4D in the direction of the central axis O. In the above-described attachment state, the detent part 3C protruding at the rear end of the engaged part 3B is housed at the recessed site 4E, passing through the engaging part 4D.

Moreover, in the above-described attachment state, the engaged part 3B is engaged in such a manner that the outer circumferential face thereof is firmly attached on the inner circumferential face of the engaging part 4D and fitted into the recessed part. In other words, in the present embodiment where the recessed part is as an irregular surface having the above-described surface roughness, the outer circumferential face of the engaged part 3B is as an irregular face along a contour of the irregular surface and firmly attached on the inner circumferential face of the engaging part 4D and engaged with the recessed part. It is, however, acceptable that the outer circumferential face of the engaged part 3B is not entirely firmly attached on the recessed part in such a manner that the irregular surface formed by the inner circumferential face of the engaging part 4D is reversed as is. As long as the coupling member 3 is reliably attached with strength, it is acceptable that the outer circumferential face thereof is fitted in the midstream of the depth of the recessed part and engaged therewith.

Figure 4:
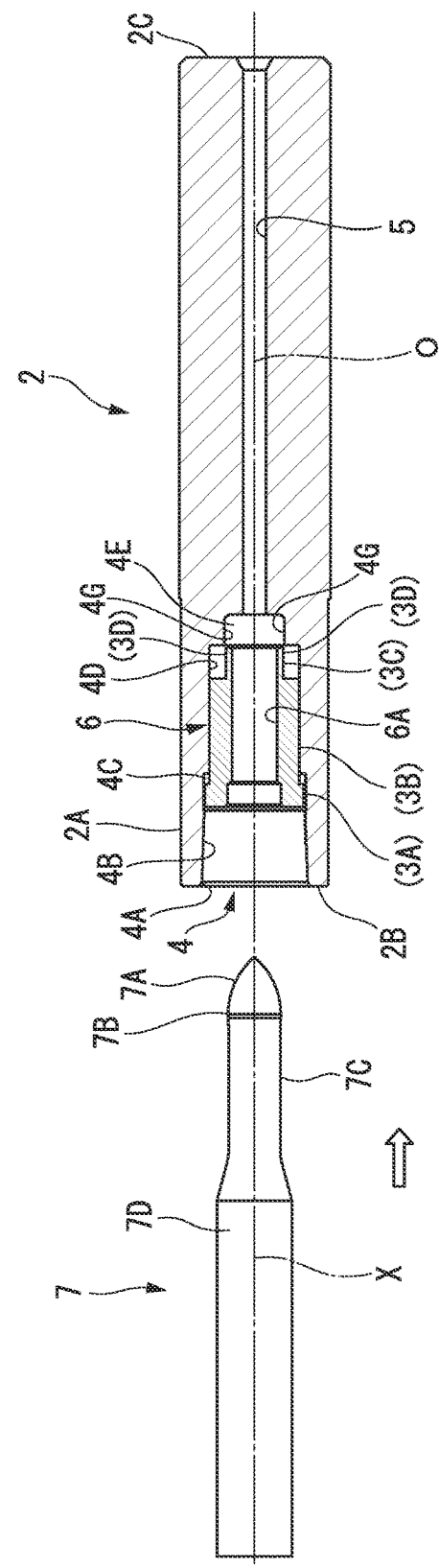
FIG. 4 is a drawing which describes a case where the coupling member is allowed to undergo plastic deformation in the embodiment shown in FIG. 1.
Figure 5:
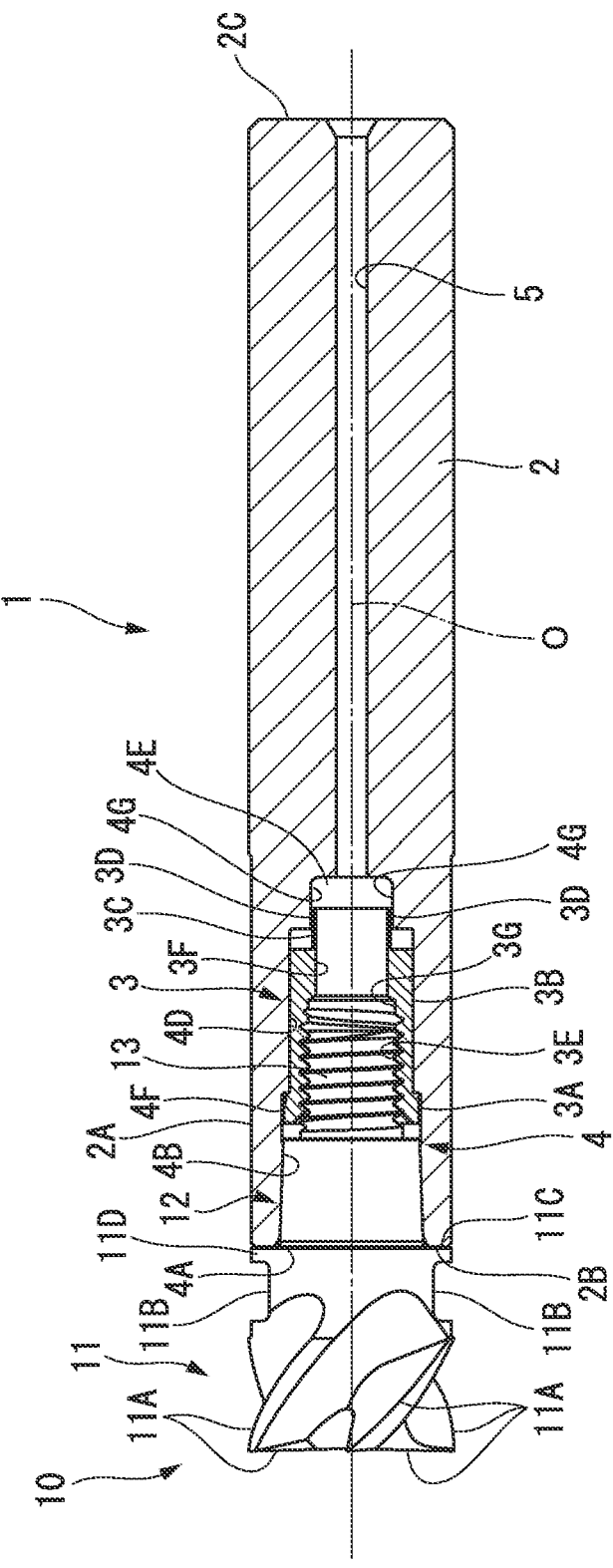
FIG. 5 is a side sectional view which shows one embodiment of a head replacement-type cutting tool of the present invention in which the replacement-type cutting head is attached to the embodiment shown in FIG. 1.

As described above, in order that the outer circumferential face of the engaged part 3B of the coupling member 3 is firmly attached on the inner circumferential face of the engaging part 4D of the attachment hole 4 and engaged with the recessed part, a multiple-step cylindrical blank 6 of the coupling member 3 as shown in FIG. 3(a) in which the outer diameter of the engaged part 3B is made slightly smaller than the inner diameter of the engaging part 4D is, for example, formed with the above-described stainless steel, and housed into the attachment hole 4, as shown in FIG. 4. Moreover, the press-fit member (punch) 7 which has the outer diameter slightly larger than the inner diameter of the blank 6 is press-fitted into the inner circumferential part of the blank 6 and allowed to undergo plastic deformation so as to increase the diameter of the blank 6. Thereby, it is acceptable that the outer circumferential face of the engaged part 3B is pressed to the inner circumferential face of the engaging part 4D and fitted into the recessed part (irregular surface).

Here, the blank 6 is made substantially equal in length in the direction of the central axis O to each of the parts of the coupling member 3 shown in parentheses in FIG. 3(a) and FIG. 4. Further, the collar part 3A is equal in outer diameter, cross-sectional shape and volume to the detent part 3C. However, the female thread part 3E is not formed in the inner circumferential part of the blank 6 and is as a shouldered hole in which a part positioned at the collar part 3A at the leading end of the inner circumferential part in the direction of the central axis O is made even slightly larger in diameter than a press-fit hole part 6A penetrating through the detent part 3C which is further at the rear end. The press-fit hole part 6A is constant in inner diameter which is slightly smaller, for example, by about 0.2 mm to 1.0 mm than the inner diameter of the through hole part 3F of the coupling member 3 in a state that the engaged part 3B is allowed to undergo plastic deformation and engaged with the engaging part 4D. It is noted that the outer diameter of the engaged part 3B of the blank 6 is made smaller, for example, by 0.1 mm to 0.5 mm than the inner diameter of the engaging part 4D of the attachment hole 4.

Further, a press-fit member 7 is, for example, made of a material higher in hardness than the above-described stainless steel which forms the coupling member 3 and the blank 6. Moreover, the press-fit member 7 is formed in a shaft shape so that a cross section orthogonal to a press-fit axis X disposed coaxially with the central axis O is formed in a circular shape. A point part 7A which is at a side press-fitted to the blank 6 of the press-fit member 7 (on the right side in FIG. 4) is formed in a bullet shape. The press-fit member 7 is provided with a large diameter part 7B at the rear end of the point part 7A and formed so as to extend to a base end part 7D which is attached to a press-fit device (not illustrated) via a tapered part 7C which slightly decreases in outer diameter moving from the large diameter part 7B to the base end side of the press-fit member 7 (on the left side in FIG. 4). It is noted that a difference in outer diameter between the large diameter part 7B and a diameter-decreasing part at the rear end side of the tapered part 7C is, for example, in a range of 20 μm to 200 μm.

Moreover, the outer diameter of the large diameter part 7B is made larger than the inner diameter of the press-fit hole part 6A of the blank 6. Here, the difference between the outer diameter of the large diameter part 7B and the inner diameter of the press-fit hole part 6A is set so that plastic deformation of the blank 6 undergoes when the press-fit member 7 is press-fitted into the press-fit hole part 6A. However, where the difference is excessively large, the blank 6 may increase in diameter unnecessarily to break the holder main body 2. Therefore, an upper limit of the difference is set, with the above-described situation taken into consideration. Thus, the upper limit is a value substantially equal to a difference in inner diameter between the press-fit hole part 6A and the through hole part 3F, for example, in a range of 0.2 mm to 1.0 mm.

Therefore, as shown in FIG. 4, the blank 6 is housed into the attachment hole 4 to fix the holder main body 2. As described above, the press-fit axis X of the press-fit member 7 is disposed coaxially with the central axis O and the press-fit device is used to insert the press-fit member 7 into the inner circumferential part of the blank 6, as shown with an arrow given in FIG. 4. Then, the point part 7A of the press-fit member 7 is at first brought into contact with the opening part of the press-fit hole part 6A, by which the blank 6 is pressed into the rear end side of the holder main body 2. The collar part 3A is brought into contact with the wall part 4F of the attachment hole 4 and the detent part 3C is housed in the recessed site 4E. At this time, the blank 6 is restrained from moving in the direction of the central axis O.

Next, the press-fit member 7 is allowed to move further forward and press-fitted into the press-fit hole part 6A, and the engaged part 3B of the blank 6 then undergoes plastic deformation so that the large diameter part 7B increases in diameter. Thereby, the outer circumferential face of the engaged part 3B is firmly attached on the inner circumferential face of the engaging part 4D and pressed so as to be fitted into the recessed part and engaged with the recessed part. Then, for example, when the large diameter part 7B reaches the rear end of the engaged part 3B, the press-fit member 7 is allowed to move backward and pulled out from the press-fit hole part 6A. Then, the blank 6 is attached into the attachment hole 4 and firmly integrated with the holder main body 2, and the press-fit hole part 6A is allowed to increase in diameter, thereby forming the through hole part 3F. Thereafter, a screw pilot hole 3G and the female thread part 3E, each of which has a predetermined inner diameter at the center of the central axis O, are formed at the leading end of the through hole part 3F, thus making it possible to obtain the above constituted holder for a head replacement-type cutting tool 1. Where there is no fear that the press-fit member 7 may interfere with the holder main body 2, it is acceptable that the large diameter part 7B is press-fitted until being pulled out from the rear end of the press-fit hole part 6A.

The thus constituted holder for a head replacement-type cutting tool 1 is constituted as the head replacement-type cutting tool of the present embodiment by attaching a replacement-type cutting head 10 to the leading end part thereof in a coupling manner, as shown in FIG. 5, and used in cutting a workpiece by attaching the holder main body 2 to a machine tool. The replacement-type cutting head 10 is provided at the leading end part with a cutting part 11. An attachment part 12 which is attached to the attachment hole 4 of the holder main body 2 is formed at the rear end side of the cutting part 11. A male thread part 13 as a head-side screw part which is screwed into the female thread part 3E, that is, an attachment screw part of the coupling member 3, is installed further at the rear end thereof so as to be positioned at the center of the central axis O.

Here, in the head replacement-type cutting tool of the present embodiment which is used as a head replacement-type end mill, a plurality of cutting edges 11A are formed at the leading end of the cutting part 11 so as to be positioned at the center of the central axis O of the holder main body 2. On the outer circumference of the rear end of the cutting part 11, there is formed a turning part 11B with which a hand tool such as a wrench is engaged and turned on attachment or detachment of the replacement-type cutting head 10. The turning part 11B is at least as a pair of parallel faces which are parallel with the central axis O and parallel with each other and formed so as to notch the rear end part of the circular plate-like cutting part 11.

Further, the turning part 11B is formed, with an interval kept from a rear end face 11C of the cutting part 11. Thereby, between the turning part 11B and the rear end face 11C, formed is a flange part 11D which protrudes outside in a radial direction at the center of the central axis O. It is noted that the rear end face 11C is made substantially equal in outer diameter to the leading end face 2B of the holder main body 2 and is as a flat face so as to be perpendicular to the central axis O.

Still further, the attachment part 12 is attached by being fitted into the fitting part 4B of the attachment hole 4. In the present embodiment in which the fitting part 4B is formed in a tapered shape in which the inner circumferential face thereof gradually increases in inner diameter moving to the opening part of the attachment hole 4, the attachment part 12 is also formed in a circular truncated cone-like tapered shape at the center of central axis O which gradually increases in outer diameter so as to give such an inclination angle and a dimension that are equal to those of the fitting part 4B moving toward the base end side of the attachment part 12 (at the leading end side of the replacement-type cutting head 10 and on the left side in FIG. 5).

It is desirable that the cutting part 11 and the attachment part 12 are formed with a hard material such as the cemented carbide, cermet or ceramic, as with the holder main body 2, with consideration given to the strength of the cutting edge 11A of the cutting part 11 and the rigidity on attachment of the attachment part 12 to the holder for a head replacement-type cutting tool 1. On the other hand, with consideration given to breakage of the screw thread and easy formation of the male thread part 13, it is desirable that the male thread part 13 as a head-side screw part is made of a metal material lower in hardness than the cutting part 11 and the attachment part 12, as with the coupling member 3, for example, a steel material such as stainless steel or dies steel higher in ductility than the hard material.

Therefore, as described above, attachment of the male thread part 13 different in material to the cutting part 11 and the attachment part 12 is similar to attachment of the coupling member 3 to the holder main body 2 in the holder for a head replacement-type cutting tool 1 of the above-described embodiment. In other words, it is acceptable that a head-side attachment hole having a recessed part on an inner circumferential face thereof is formed at the cutting part 11 and the attachment part 12 which are formed with the above-described hard material in an integrated manner, an external thread member as a head-side coupling member made of stainless steel or the like, which forms the male thread part 13 is housed in the head-side attachment hole, and the outer circumferential face of the external thread member is firmly attached on the inner circumferential face of the head-side attachment hole and engaged with the recessed part.

More specifically, the head-side attachment hole is formed at the cutting part 11 and the attachment part 12 so as to run along the central axis O, and on the inner circumferential face thereof, there is formed a recessed part composed of an irregular surface having a maximum height roughness Rz of 5 μm or more to 200 μm or less, and the recessed part is provided with at least one of a wall part which faces a hole bottom of the head-side attachment hole (at the leading end side of the replacement-type cutting head 10) and a flat face-like wall part which faces a circumferential direction around the central axis O, for example, extending in the direction of the central axis O. On the other hand, the external thread member is formed in a cylindrical shape having an inner circumferential part in which a part housed into the head-side attachment hole is smaller in inner diameter than a part at which the male thread part 13 is formed.

Moreover, a small inner diameter part of the external thread member is housed into the head-side attachment hole to fix the external thread member on the hole bottom. Moreover, in the above-described embodiment, in a similar manner as the press-fit member 7 is press-fitted to the blank 6 of the coupling member 3, a press-fit member (punch) is press-fitted into the inner circumferential part thereof, thereby allowing the external thread member to undergo plastic deformation. As a result, the outer circumferential face of the small inner diameter part is firmly attached on the inner circumferential face of the head-side attachment hole and engaged so as to be fitted into the recessed part. Thus, as described above, there is obtained a replacement-type cutting head 10 in which the cutting part 11 and the attachment part 12 are made of a hard material, while the male thread part 13 is made of a material lower in hardness.

As with the above-described embodiment, a small inner diameter part of the external thread member before being press-fitted is smaller by about 0.2 mm to 1.0 mm than the inner diameter of the same part after being press-fitted and also smaller than the outer diameter of a large diameter part of the press-fit member. Further, the outer diameter of the small inner diameter part of the external thread member before being press-fitted is made smaller, for example, by about 0.1 mm to 0.5 mm than the inner diameter of a part at which the recessed part of the head-side attachment hole is formed. Still further, a difference in outer diameter between the large diameter part of the press-fit member and a small diameter part at the rear end thereof is, for example, about 20 µm to 200 µm. It is acceptable that the male thread part 13 is formed on an outer circumferential face of a part of the external thread member larger in inner diameter after being press-fitted. However, where the large diameter part is larger in inner diameter than the large diameter part of the press-fit member, the large diameter part will not undergo plastic deformation. Thus, it is acceptable that the male thread part 13 is formed in advance and then press-fitted.

The thus constituted replacement-type cutting head 10 is pressed into the holder for a head replacement-type cutting tool 1 of the above-described embodiment by screwing the male thread part 13 into the female thread part 3E. After the attachment part 12 is in contact with the fitting part 4B of the attachment hole 4 in a sliding manner, the turning part 11B is engaged with a hand tool and turned. Thereby, the attachment part 12 which is formed in a tapered shape is firmly attached on the fitting part 4B which is also formed in a tapered shape and attached thereto in a coupling manner. It is desirable that in a state that the replacement-type cutting head 10 is attached as described above, the rear end face 11C of the cutting part 11 is in contact with the leading end face 2B of the holder main body 2 and firmly attached thereon.

Further, the thus constituted head replacement-type cutting tool of the present embodiment which is an end mill is such that, as described above, the rear end part of the holder main body 2 of the holder for a head replacement-type cutting tool 1 is attached to a machine tool and fed in a direction intersecting with the central axis O, while being rotated around the central axis O, cutting a workpiece by the cutting part 11 of the replacement-type cutting head 10. Here, the male thread part 13 is screwed into the female thread part 3E in a direction opposed to a direction at which the head replacement-type cutting tool rotates on cutting.

In the above constituted holder for a head replacement-type cutting tool 1, as described above, the holder main body 2 in which the rear end part thereof is attached to a machine tool and the leading end part thereof is attached to the replacement-type cutting head 10 is formed with a hard material such as the cemented carbide, cermet or ceramic and able to secure high strength and high rigidity. Therefore, it is possible to prevent occurrences of breakage or chattering vibration and also to provide high machining accuracy, when used for cutting as a head replacement-type cutting tool. In particular, in the head replacement-type cutting tool of the present embodiment, the cutting part 11 and the attachment part 12 of the replacement-type cutting head 10 attached to the holder for a head replacement-type cutting tool 1 are also formed with a similar hard material. It is possible to impart high rigidity and high strength to the cutting tool as a whole and also to improve the machining accuracy.

On the other hand, the coupling member 3 having the female thread part 3E as an attachment screw part for coupling the replacement-type cutting head 10 is lower in hardness than a hard material with which the holder main body 2 is formed. However, in contrast, since the coupling member 3 is made of a metal material high in ductility, that is, a steel material such as stainless steel, the female thread part 3E can be easily made, and breakage, for example, will not occur while making a common shape screw thread. It is also possible to prevent an increase in cost, unlike the above-described case where the attachment screw part is formed directly on a hard material. That is also true for a case where in the replacement-type cutting head 10 of the head replacement-type cutting tool of the present embodiment, as described above, the male thread part 13 as a head-side screw part is formed on the external thread member (head-side coupling member) which is lower in hardness than a hard material with which the cutting part 11 and the attachment part 12 are formed.

Then, the coupling member 3 which is lower in hardness but higher in ductility than the holder main body 2 is engaged in such a manner that the outer circumferential face of the engaged part 3B is firmly attached on the inner circumferential face of the engaging part 4D in the attachment hole 4 of the holder main body 2 and fitted into a recessed part formed on the inner circumferential face thereof. In other words, the coupling member 3 is engaged with the outer circumferential face of the engaged part 3B so as to form a raised part fitted into the recessed part.

Therefore, the coupling member 3 can be firmly attached into the attachment hole 4 and integrated with the holder main body 2. Where cutting is carried out by the replacement-type cutting head 10 attached by screwing the male thread part 13 into the female thread part 3E, loads, on cutting will not cause rattling of the replacement-type cutting head 10. It is, therefore, possible to carry out stable cutting owing to high rigidity and high strength of the holder main body 2.

Further, in the above-constituted holder for a head replacement-type cutting tool 1, in order for the outer circumferential face of the engaged part 3B of the coupling member 3 to be engaged with the recessed part on the inner circumferential face of the engaging part 4D of the attachment hole 4, the coupling member 3 is formed in a tubular shape and lower in hardness and higher in ductility than the holder main body 2. In the holder for a head replacement-type cutting tool 1, as described above, the blank 6 of the coupling member 3 is used in which the outer diameter of the engaged part 3B is made smaller than the inner diameter of the engaging part 4D, and the press-fit member 7 having an outer diameter larger than the inner diameter of the press-fit hole part 6A is press-fitted into the press-fit hole part 6A on the inner circumference of the blank 6. Thereby, the blank 6 is allowed to undergo plastic deformation so as to increase in diameter and firmly attached to the inner circumferential face of the engaging part 4D, and the engaged part 3B of the coupling member 3 is allowed to be engaged with the recessed part.

Therefore, the outer circumferential face of the blank 6 is firmly attached on the inner circumferential face of the engaging part 4D so as to be pressed uniformly and entirely. Thus, the outer circumferential face which has undergone plastic deformation can be evenly fitted into the recessed part formed on the engaging part 4D to attain engagement without fail. Thereafter, the female thread part 3E is formed on the press-fit hole part 6A of the blank 6 and is as the coupling member 3. Thereby, the coupling member 3 can be more firmly integrated with the holder main body 2.

However, on the other hand, as described above, the coupling member 3 which has been engaged with the recessed part and integrated with the holder main body 2 is only connected mechanically with the holder main body 2 unlike bonding by soldering. As a result, for example, a jig, is used to apply to the coupling member 3 an excessive tensile force exceeding an engagement force with the recessed part, by which the coupling member 3 is pulled out from the holder main body 2 and separated. Therefore, even the holder for a head replacement-type cutting tool 1 which is not usable in case of breakage, can be recovered separately the coupling member 3 from the holder main body 2, each of which is made of a different material. Thus, they can be recycled easily.

Further, in the present embodiment, the recessed part which is formed on the inner circumferential face of the engaging part 4D in the attachment hole 4 is such that the inner circumferential face thereof is as an irregular surface whose maximum height roughness Rz is from 5 μm or more to 200 μm or less, by which a recess itself on the irregular surface is used as the recessed part. Therefore, the recessed part is formed over the entire inner circumferential face of the engaging part 4D. The outer circumferential face of the engaged part 3B of the coupling member 3 which has undergone plastic deformation as described above is firmly attached on the thus formed recessed part to attain engagement. Therefore, a great frictional force will occur between the inner circumferential face of the engaging part 4D and the outer circumferential face of the engaged part 3B. Thereby, it is possible to integrate the coupling member 3 with the holder main body 2 more stably and firmly.

For example, the inner circumferential face of the engaging part 4D in the attachment hole 4 of the holder main body 2 was adjusted for its maximum height roughness Rz to 7.0 μm, and the outer circumferential face of the engaged part 3B of the blank 6 formed on the coupling member 3 was adjusted for its maximum height roughness Rz to 2.0 μm. Next, the press-fit member 7 was press-fitted into the blank 6 housed at the engaging part 4D, as described in the above embodiment, and integrated with the holder main body 2. Thereafter, the holder main body 2 was broken to measure the surface roughness of the outer circumferential face of the engaged part 3B of the blank 6, confirming that the maximum height roughness Rz was changed to 5.5 μm. This clearly shows that, as described above, the outer circumferential face of the blank 6 undergoes plastic deformation along the irregular surface of the inner circumferential face of the engaging part 4D. It is noted that the above-described Rz is a maximum height roughness which is stipulated by JIS B 0601:2001 (ISO 4287: 1997) and the result has been evaluated under conditions of reference length: 0.8 mm and cut off value λs=0.0025 mm and λc=0.8 mm.

Further, a hard material which forms the holder main body 2 is a sintered material such as the cemented carbide, cermet or ceramic, a compressed powder body before sintering is processed in such a manner that a face is as the inner circumferential face of the engaging part 4D can attain a surface roughness in the above-described range after sintering, a heating temperature and heating time on sintering are adjusted, and the inner circumferential face of the engaging part 4D is polished after sintering to decrease the surface roughness or the surface is made rough to increase the surface roughness. Alternatively, where the inner circumferential face of the engaging part 4D after sintering is in the above-described range of surface roughness, the engaging part 4D is not polished, with a sintered surface kept as is, by which the inner circumferential face of the engaging part 4D can be reliably adjusted to attain the above-described surface roughness.

Here, in particular where a sintered material which forms the holder main body 2 contains Co as a binder as found in WC—Co-based the cemented carbide and the engaging part 4D in the attachment hole 4 of the holder main body 2 is not polished after sintering but a sintered surface is kept as is to adjust the surface roughness in the above-described range, a cobalt-rich region which contains Co abundantly is formed on a surface of the inner circumferential face of the engaging part 4D. The cobalt-rich region is a region which will develop on the surface of the inner circumferential face of the engaging part 4D by heating the compressed powder body in a sintering step of a sintered material, and the region contains Co as a major component and has the thickness of about 0.5 μm to 5 μm. It is, therefore, acceptable that the irregular surface is formed so as to contain the cobalt-rich region.

Where the inner circumferential face of the engaging part 4D in the attachment hole 4 is less than 5 μm in maximum height roughness Rz, there is a fear that the coupling member 3 may not be firmly integrated with the holder main body 2 due to an insufficient frictional force. Further, where it is more than 200 μm in maximum height roughness Rz, in order that the outer circumferential face of the engaged part 3B is reliably engaged with the irregular surface which is a recessed part on plastic deformation of the blank 6, it is necessary to decrease as much as possible a difference between the inner diameter of the inner circumferential face of the engaging part 4D and the outer diameter of the engaged part 3B of the blank 6. It may be difficult to insert the blank 6 into the attachment hole 4.

Further, in the present embodiment, the attachment screw part which is formed on the thus engaged coupling member 3 is the female thread part 3E and screwed into the male thread part 13 acting as a head-side screw part which is formed on the replacement-type cutting head 10. Then, in the attachment state that the coupling member 3 is engaged with the engaging part 4D in the attachment hole 4 and attached to the holder main body 2, in the present embodiment, the female thread part 3E extends from the leading end of the coupling member 3 up to a site exceeding ½ of the length of the engaging part 4D in the direction of the central axis O. In other words, a range at which the female thread part 3E is formed is allowed to overlap on a range at which the engaged part 3B is engaged with the engaging part 4D in the direction of the central axis O on an inner circumference and an outer circumference of the coupling member 3.

Therefore, immediately on the inner circumference of the engaged part 3B of the coupling member 3 which is engaged with the engaging part 4D of the attachment hole 4, the replacement-type cutting head 10 is attached by screwing the male thread part 13 into the female thread part 3E. As a result, even where a cutting force acting from the cutting part 11 of the replacement-type cutting head 10 on cutting is transmitted to the male thread part 13, the force can be received via the engaged part 3B immediately on the outer circumference of the female thread part 3E by the engaging part 4D. It is possible to support the replacement-type cutting head 10 more stably and to carry out smooth cutting.

However, in the present embodiment, as described above, the attachment screw part of the holder for a head replacement-type cutting tool 1 is as the female thread part 3E and the head-side screw part of the replacement-type cutting head 10 is as the male thread part 13. In contrast, the attachment screw part of the holder can be given as the male thread part and the head-side screw part can be given as the female thread part. In this case, in a similar manner as the external thread member different in material is attached to the cutting part 11 and the attachment part 12 of the replacement-type cutting head 10, it is acceptable that a cylindrical coupling member having a male thread part on an outer circumference of the leading end part is housed into the engaging part 4D of the attachment hole 4, and a press-fit member is press-fitted into the inner circumferential part of the coupling member to give plastic deformation to the coupling member, by which the outer circumferential part thereof is engaged with the engaging part 4D.

On the other hand, in order to receive more reliably the cutting force acting on the replacement-type cutting head 10, in the present embodiment, the fitting part 4B is formed at the opening part of the attachment hole 4. The fitting part 4B is such that a cross section orthogonal to the central axis O of the holder main body 2, in other words, a cross section orthogonal to the central axis O of the attachment hole 4 is formed in a circular shape at the center of the central axis, and the fitting part 4B is fitted into the attachment part 12 of the replacement-type cutting head 10 in which a cross section orthogonal to the central axis O is also formed in a circular shape. Therefore, the fitting part 4B is fitted into the attachment part 12, by which the cutting force can also be received. The present embodiment can be further improved in rigidity and strength as a head replacement-type cutting tool.

Further, in the present embodiment, the fitting part 4B is formed in a tapered shape which increases in inner diameter moving toward the opening part of the attachment hole 4. The attachment part 12 formed in a tapered shape which gradually increases in outer diameter moving toward the base end at an inclination angle equal to that of the fitting part 4B is fitted into the fitting part 4B in a tapering manner. Thereby, the replacement-type cutting head 10 is attached to the holder for a head replacement-type cutting tool 1.

As a result, as the male thread part 13 of the replacement-type cutting head 10 is screwed into the female thread part 3E of the holder for a head replacement-type cutting tool 1, a tapered face formed by the inner circumferential face of the fitting part 4B is pressed uniformly by a tapered face formed by the outer circumferential face of the attachment part 12. At the same time, the attachment part 12 causes wedge effects so as to expand the fitting part 4B, thereby producing a great friction resistance between the tapered faces. As a result, even where an excessively large cutting force is applied to the cutting part 11 of the replacement-type cutting head 10, it is possible to receive the cutting force only between these tapered faces. Further, in the head replacement-type cutting tool of the present embodiment, the holder main body 2 on which the fitting part 4B is formed and the attachment part 12 of the replacement-type cutting head 10 are made of a hard material such as the cemented carbide. Thus, the hard materials are directly in contact and fitted with each other, by which the replacement-type cutting head 10 can be supported by greater rigidity and strength.

Further, the fitting part 4B and the attachment part 12 are able to receive the cutting force and others which will develop on cutting. It is, therefore, possible to reduce a cutting force acting on the female thread part 3E of the coupling member 3 or a drawing force or torque acting on the coupling member 3 by screwing the male thread part 13 into the female thread part 3E on attachment to the replacement-type cutting head 10. Eliminated is the necessity for unnecessarily increasing an engagement force with the engaging part 4D by plastic deformation of the coupling member 3. Thus, for example, as described above, where the holder main body 2 and the coupling member 3 are recovered separately, it is possible to remove the coupling member 3 from the holder main body 2 relatively easily.

As described above, in the state that the replacement-type cutting head 10 is attached, the rear end face 11C of the cutting part 11 is in contact with the leading end face 2B of the holder main body 2 and firmly attached thereon. Thereby, the leading end face 2B and the rear end face 11C are in contact with and also firmly attached to the inner circumferential face of the fitting part 4B and the outer circumferential face of the attachment part 12, each of which is formed in a tapered shape. It is, thereby, possible to attach the replacement-type cutting head 10 by restraining the two faces or what is called two-face restraint. Moreover, in this case as well, in the present embodiment, the leading end face 2B and the rear end face 11C are formed at the holder main body 2 and the cutting part 11 of the replacement-type cutting head 10, each of which is made of a hard material. These hard materials are directly in contact with each other, thus making it possible to support more firmly the replacement-type cutting head 10.

Further, each of the fitting part 4B and the attachment part 12 is formed in a tapered shape at the center of the central axis O and fitted with each other. Thereby, the central axis of the replacement-type cutting head 10 on attachment to the holder for a head replacement-type cutting tool 1 allows for accurate alignment with the central axis O of the attachment hole 4 of the holder main body 2. Therefore, in the replacement-type cutting head 10, based on the central axis of the attachment part 12 formed in a tapered shape, the cutting edge 11A of the cutting part 11 is formed. Thereby, the cutting edge 11A is also accurately placed at the center of the central axis O of the holder main body 2, and cutting can be carried out at a higher accuracy by using the head replacement-type cutting tool.

Where an inclination angle formed with respect to the central axis O by the inner circumferential face of the fitting part 4B and the outer circumferential face of the attachment part 12, each of which formed in a tapered shape, becomes excessively large, the replacement-type cutting head 10 may be loosely attached to the holder because the above-described wedge effects are not sufficiently achieved. On the contrary, where the inclination angle is excessively small, the wedge effects become excessively strong to cause an excessively large friction resistance, which will need a great force for removing the replacement-type cutting head 10. Therefore, the inclination angle is preferably in a range of 1° to 20°, as described in the present embodiment, more preferably in a range of 1° to 5° and still more preferably in a range of 1° to 3°. An optimal inclination angle is about 2°.

In the present embodiment, as described above, the fitting part 4B and the attachment part 12 are formed in a tapered shape at the center of the central axis O so that the fitting part 4B gradually increases in inner diameter and the attachment part 12 gradually increases in outer diameter moving respectively toward the opening part of the attachment hole 4 and the base end of the attachment part 12. However, where a cross section orthogonal to the central axis O is formed in a circular shape at the center of the central axis O so that the male thread part 13 can be screwed into the female thread part 3E by rotating the replacement-type cutting head 10, it is acceptable that, for example, as shown in a modified example given in FIG. 6, the inner circumferential face of the fitting part 4B and the outer circumferential face of the attachment part 12 are formed in the shape of a cylindrical face at the center of the central axis O so as to be fitted with each other. In the modified example shown in FIG. 6 and a modified example shown in FIG. 7 which is to be described later, parts common to those of the above-described embodiment will be given the same reference numerals, a description of which will be omitted here.

Figure 6:
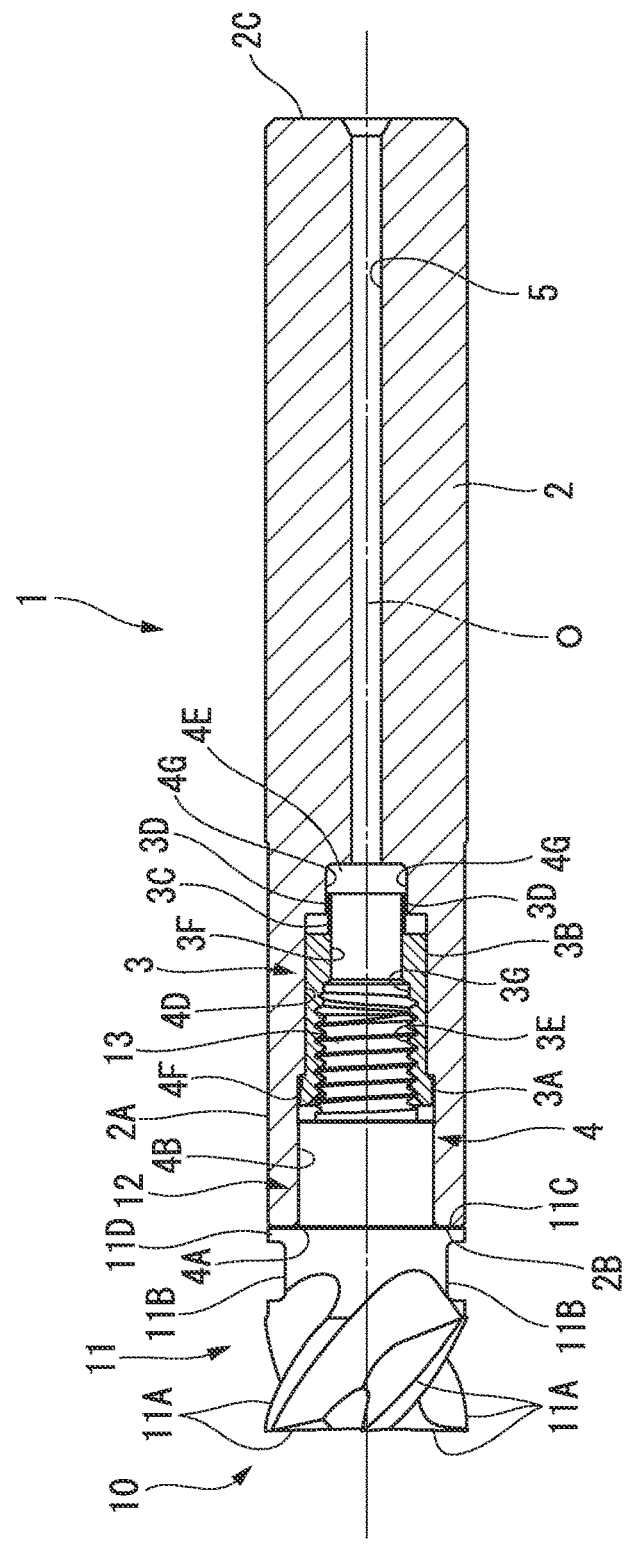
FIG. 6 is a side sectional view which shows a modified example of the embodiment shown in FIG. 5.

Here, in the modified example shown in FIG. 6, the inner circumferential face of the fitting part 4B and the outer circumferential face of the attachment part 12 are allowed to be fitted with each other, for example, in a range of fitting tolerance. Therefore, although no wedge effects are provided, the replacement-type cutting head 10 can be attached to the holder for a head replacement-type cutting tool 1 axially and accurately with respect to the central axis O. In this case, the replacement-type cutting head 10 is screwed into the holder main body 2, by which the rear end face 11C of the cutting part 11 is in contact with the leading end face 2B of the holder main body 2, firmly attached, and pressed to support the replacement-type cutting head 10.

Still further, in the present embodiment, a recessed site 4E is formed at the deepest part of the attachment hole 4 and a detent part 3C is formed at the rear end of the coupling member 3. The recessed site 4E and the detent part 3C are respectively provided with a wall face 4G and a side face 3D, each having a straight-line cross section orthogonal to the central axis O. Next, in the attachment state with the coupling member 3 attached, the wall face 4G is opposed to the side face 3D and the detent part 3C is housed into the recessed site 4E. Thus, the coupling member 3 is, if attempted to rotate around the central axis O, restrained from rotation around the central axis O also due to the fact that the side face 3D of the detent part 3C is in contact with the wall face 4G of the recessed site 4E. Even where an excessively large cutting force is applied from the replacement-type cutting head 10 to the coupling member 3 on cutting, the coupling member 3 rotates loosely inside the attachment hole 4, thus making it possible to prevent dropping thereof together with the replacement-type cutting head 10 due to disengagement from the recessed part.

In the present embodiment, the detent part 3C is formed so as to give an ellipse shaped-cross section, the pair of side faces 3D are formed parallel with each other and also parallel with the central axis O. These side faces 3D are opposed and allowed to be in contact with the pair of wall faces 4G of the recessed site 4E, each of which is also formed to give an ellipse shaped-cross section. Moreover, as shown in the modified example of FIG. 7(a), the recessed site 4E is formed so that a cross section orthogonal to the central axis O is formed substantially in a square shape, thereby forming two pairs of wall faces 4G in which wall faces 4G adjacent in a circumferential direction are kept orthogonal with each other. As to the detent part 3C, it is acceptable that, as shown in the modified examples of FIGS. 7(b) and (c), there are formed two pairs of side faces 3D so that side faces 3D adjacent with each other are allowed to be orthogonal in a circumferential direction. It is also acceptable that the side faces 3D are opposed and allowed to be in contact with the wall faces 4G, thereby restraining rotation of the coupling member 3.

Further, as long as the side face 3D and the wall face 4G are formed in the shape of a straight line on a cross section orthogonal to the central axis O, opposed and in contact with each other, thus making it possible to restrain rotation of the coupling member 3, it is acceptable that the side face 3D and the wall face 4G are provided by one, three or five or more each. It is also acceptable that each of them is formed in an inclined flat face or a curved face which moves to the central axis O moving to the rear end thereof. Still further, in the present embodiment, when the press-fit member 7 is press-fitted into a press-fit hole part 6A of the blank 6 of the coupling member 3, the large diameter part 7B is stopped around the rear end of the engaged part 3B of the press-fit hole part 6A and pulled out so that the large diameter part 7B of the press-fit member 7 will not reach the detent part 3C housed at the recessed site 4E. The side face 3D is not in contact with the wall face 4G but opposed thereto, with their positions in a circumferential direction being in alignment and also with an interval kept. When the coupling member 3 runs idle, the side face 3D is brought into contact with the wall face 4G to stop the rotation. However, as described above, if there is no fear that the press-fit member 7 may interfere with the holder main body 2, it is acceptable that the press-fit member 7 is press-fitted up to a site at which the large diameter part 7B is pulled out from the rear end of the press-fit hole part 6A, and the detent part 3C of the blank 6 is also allowed to undergo plastic deformation to increase a diameter, thereby the side face 3D is from the start firmly attached on the wall face 4G and brought into contact therewith.

Figure 7:
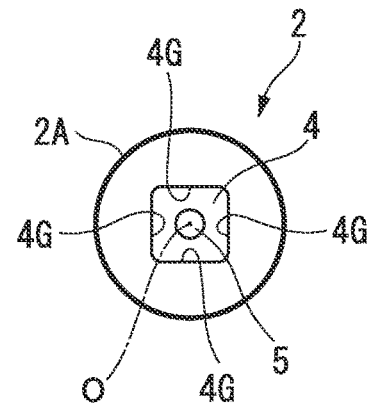
FIG. 7(a) is a drawing which shows a modified example of the embodiment shown in FIG. 1, corresponding to the sectional view taken along the line of Z to Z in FIG. 2(a) which covers the holder main body.
FIG. 7(b) is a perspective view which shows the blank before the coupling member is allowed to undergo plastic deformation.
FIG. 7(c) is a perspective view which shows the coupling member after the blank of FIG. 7(b) is allowed to undergo plastic deformation to form an attachment screw part (that is, a drawing which shows the coupling member itself which is housed into the attachment hole of the holder and formed in an integrated manner).
Figure 7:
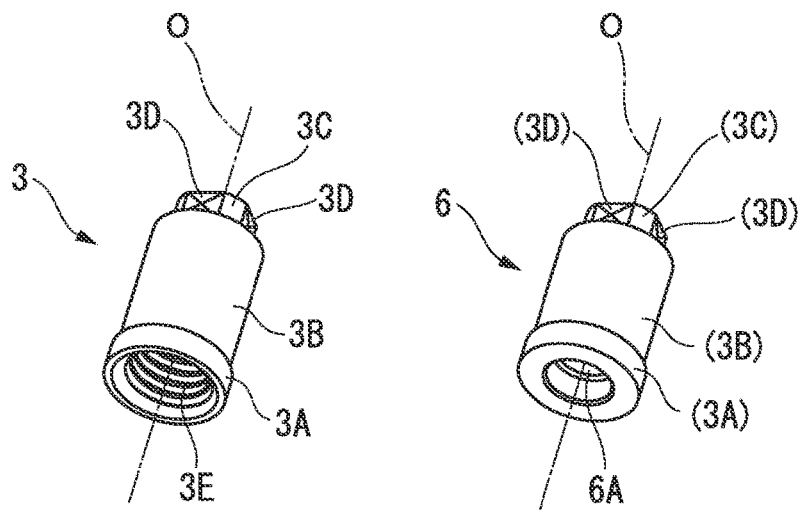

In the above-described embodiment and in the modified example shown in FIG. 7, the detent part 3C is formed at the rearmost end of the coupling member 3 and housed at the recessed site 4E formed at the deepest part of the attachment hole 4, and the side face 3D and the wall face 4G which are formed respectively at the detent part 3C and the recessed site 4E are allowed to be in contact with each other. Moreover, for example, a flat face-like side face extending parallel with the central axis O is formed at the engaged part 3B of the coupling member 3 and a flat face-like wall face extending also parallel with the central axis O so as to be opposed to the side face is formed at the engaging part 4D of the attachment hole 4, and when the blank 6 of the coupling member 3 is allowed to undergo plastic deformation, the side face and the wall face are firmly attached and in contact with each other, thus making it possible to stop rotation of the coupling member 3.

In the above-described replacement-type cutting head 10, the head-side attachment hole having a recessed part on the inner circumferential face thereof is formed at the cutting part 11 and the attachment part 12, each of which is made of a hard material, so as to run along the central axis O. Moreover, the external thread member as a head-side coupling member on which the male thread part 13 is formed and which is made of stainless steel or the like, is housed into the head-side attachment hole, and a press-fit member is press-fitted into the press-fit hole part thereof. Thereby, the outer circumferential face is firmly attached on the inner circumferential face of the head-side attachment hole and engaged with the recessed part. In this case, the head-side attachment hole and the press-fit hole part are formed on the replacement-type cutting head 10. Therefore, formation of a coolant hole which is communicatively connected to them and opened on the surface of the cutting part 11 will make it possible to supply coolant from a machine tool side via the through hole 5 of the holder main body 2 of the holder for a head replacement-type cutting tool 1, the recessed site 4E, the through hole part 3F of the coupling member 3 and the female thread part 3E. It is, thereby, possible to cool the cutting edge 11A of the cutting part 11 efficiently.

In the present embodiment, the coupling member 3 is formed in a tubular shape in which the through hole part 3F is installed to penetrate through the inner circumferential part so that the coolant can be supplied as described above. However, it is acceptable that the coupling member is formed in a closed-end tubular shape in which the hole part 3F is a closed end hole that is closed by the detent part 3C at the rear end thereof. In this case, as described above, when the press-fit member 7 is press-fitted into the press-fit hole part 6A of the blank 6 of the coupling member 3, it is acceptable that the press-fit member 7 is stopped in the midstream and pulled out so that the large diameter part 7B of the press-fit member 7 will not reach the closed detent part 3C. That is also true for a case where the external thread member is engaged with the head-side attachment hole in the cutting head 10.

INDUSTRIAL APPLICABILITY

The present invention relates to a holder for a head replacement-type cutting tool in which a replacement-type cutting head having a cutting part is attached into an attachment hole in a detachable manner to constitute a head replacement-type cutting tool. According to the present invention, it is possible to perform highly accurate machining without breakage or chattering vibration.

DESCRIPTION OF REFERENCE SIGNS

1: holder for a head replacement-type cutting tool
2: holder main body
3: coupling member
3B: engaged part
3C: detent part
3D: side face of detent part 3C
3E: female thread part (attachment screw part)
4: attachment hole
4B: fitting part
4D: engaging part
4E: recessed site
4G: wall face of recessed site 4E
5: through hole
6: blank of coupling member 3
6A: press-fit hole part
7: press-fit member
10: replacement-type cutting head
11: cutting part
11A: cutting edge
12: attachment part
13: male thread part (head-side screw part)
O: central axis of holder main body 2 (central axis of attachment hole 4)

The invention claimed is:

1. A holder for a head replacement-type cutting tool in which a replacement-type cutting head having a cutting part is to be attached to an attachment hole of the holder in a detachable manner to constitute a head replacement-type cutting tool,
the holder for a head replacement-type cutting tool comprising:
a holder main body; and
a tubular coupling member which is housed in the attachment hole formed in the holder main body and made of a metal material with a lower hardness and higher in ductility than the holder main body, wherein
a fitting part, formed at an opening part side of the attachment hole, is formed in a circular shape, a center of which is at the central axis of the attachment hole in a cross section orthogonal to the central axis, and in which an attachment part formed on the replacement-type cutting head is fitted into,
an engaging part is formed at a deeper part side of the attachment hole than the fitting part and is formed in a circular shape, a center of which is at the central axis of the attachment hole in a cross section orthogonal to the central axis, and in which is housed an engaged part of the coupling member,
a recessed part is formed on an inner circumferential face of the engaging part of the attachment hole,
the coupling member is engaged with the recessed part so that an outer circumferential face of the engaged part of the coupling member is firmly attached to the inner circumferential face of the engaging part of the attachment hole, by plastically deforming the engaged part so as to increase in diameter of the engaged part, the outer circumferential face of the engaged part of the coupling member being pressed to the inner circumferential surface of the engaging part of the attachment hole for the length of the engaged part,
the coupling member is provided with an attachment screw part which is to be screwed into a head-side screw part formed on the replacement-type cutting head, and
the attachment screw part is an inwardly facing female thread part, and in the coupling member, a range at which the female thread part is formed overlaps on a range at which the outer circumferential face of the engaged part is firmly attached on the inner circumferential face of the engaging part of the attachment hole in a direction of the central axis of the attachment hole, and
in the state that the replacement-type cutting head is attached, a leading end face of the holder main body is firmly attached to a rear end face of the cutting part, and an inner circumferential face of the fitting part is firmly attached to an outer circumferential face of the attachment part.

2. The holder for a head replacement-type cutting tool according to claim 1, wherein
the recessed part is an irregular surface whose maximum height roughness Rz is 5 μm or more to 200 μm or less, and the coupling member is such that the outer circumferential part of the engaged part is at least partially allowed to undergo plastic deformation so as to run along the irregular surface, thereby the outer circumferential face of the engaged part is firmly attached on the inner circumferential face of the engaging part of the attachment hole and engaged with the recessed part.

3. The holder for a head replacement-type cutting tool according to claim 2, wherein
the recessed part is provided with at least one of a wall part which faces a hole bottom of the attachment hole and a wall part which faces in a circumferential direction around the central axis of the attachment hole.

4. The holder for a head replacement-type cutting tool according to claim 2, wherein
a recessed site having a wall face whose cross section orthogonal to the central axis of the attachment hole is formed in the shape of a straight line is formed at the deepest part of the attachment hole, and there is formed on the coupling member a detent part which has a side face capable of being in contact with the wall face so as to be opposed thereto and which is housed at the recessed site.

5. A head replacement-type cutting tool comprising:
the holder according to claim 2; and a replacement-type cutting head which is attached to the attachment hole of the holder such that the head-side screw part is screwed into the attachment screw part.

6. The holder for a head replacement-type cutting tool according to claim 1, wherein
the recessed part is provided with at least one of a wall part which faces a hole bottom of the attachment hole and a wall part which faces in a circumferential direction around the central axis of the attachment hole.

7. The holder for a head replacement-type cutting tool according to claim 6, wherein
a recessed site having a wall face whose cross section orthogonal to the central axis of the attachment hole is formed in the shape of a straight line is formed at the deepest part of the attachment hole, and there is formed on the coupling member a detent part which has a side face capable of being in contact with the wall face so as to be opposed thereto and which is housed at the recessed site.

8. A head replacement-type cutting tool comprising:
the holder according to claim 6; and
a replacement-type cutting head which is attached to the attachment hole of the holder such that the head-side screw part is screwed into the attachment screw part.

9. The holder for a head replacement-type cutting tool according to claim 1, wherein
the fitting part is formed in a tapered shape which gradually increases in inner diameter moving toward the opening part of the attachment hole.

10. The holder for a head replacement-type cutting tool according to claim 1, wherein
an inclination angle with respect to the central axis of the fitting part formed in a tapered shape is in a range of 1° to 20°.

11. The holder for a head replacement-type cutting tool according to claim 1, wherein
a recessed site having a wall face whose cross section orthogonal to the central axis of the attachment hole is formed in the shape of a straight line is formed at the deepest part of the attachment hole, and there is formed on the coupling member a detent part which has a side face capable of being in contact with the wall face so as to be opposed thereto and which is housed at the recessed site.

12. A head replacement-type cutting tool comprising:
the holder according to claim 1; and
a replacement-type cutting head which is attached to the attachment hole of the holder such that the head-side screw part is screwed into the attachment screw part.

* * * * *